(12) United States Patent
Chun et al.

(10) Patent No.: US 8,305,944 B2
(45) Date of Patent: Nov. 6, 2012

(54) METHOD FOR TRANSMITTING CONTROL INFORMATION

(75) Inventors: Jin Young Chun, Anyang-si (KR); Bin Chul Ihm, Anyang-si (KR); Wook Bong Lee, Anyang-si (KR); Jin Hyuk Jung, Anyang-si (KR); Moon Il Lee, Anyang-si (KR); Sung Ho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 408 days.

(21) Appl. No.: 12/451,347

(22) PCT Filed: May 14, 2008

(86) PCT No.: PCT/KR2008/002690
§ 371 (c)(1),
(2), (4) Date: Nov. 9, 2009

(87) PCT Pub. No.: WO2008/143423
PCT Pub. Date: Nov. 27, 2008

(65) Prior Publication Data
US 2010/0105402 A1    Apr. 29, 2010

(30) Foreign Application Priority Data

May 17, 2007 (KR) .................. 10-2007-0048305
Oct. 19, 2007 (KR) .................. 10-2007-0105738

(51) Int. Cl.
*H04K 1/10* (2006.01)
*H04W 4/00* (2009.01)
*H04J 11/00* (2006.01)

(52) U.S. Cl. ......... 370/310; 370/338; 370/203; 375/260
(58) Field of Classification Search ............ 370/310, 370/338, 203; 375/260
See application file for complete search history.

(56) References Cited

U.S. PATENT DOCUMENTS

| 8,073,069 | B2* | 12/2011 | Mundarath et al. ........ 375/267 |
| 2006/0094436 | A1* | 5/2006 | Kim et al. ............... 455/450 |
| 2006/0116080 | A1 | 6/2006 | Eom |
| 2007/0026808 | A1 | 2/2007 | Love |
| 2007/0098098 | A1* | 5/2007 | Xiao et al. ............... 375/260 |
| 2008/0267158 | A1* | 10/2008 | Zhang et al. .............. 370/342 |

* cited by examiner

*Primary Examiner* — Christopher M Brandt
*Assistant Examiner* — Muthuswamy Manoharan
(74) *Attorney, Agent, or Firm* — McKenna Long & Aldridge LLP (57) ABSTRACT

A method for transmitting control information includes receiving a control information request, transmitting primary control information responding the control information request through a primary control channel and transmitting secondary control information responding the control information request through a secondary control channel, wherein the primary control channel uses data subcarriers and the secondary control channel uses pilot subcarriers.

6 Claims, 5 Drawing Sheets

METHOD FOR TRANSMITTING CONTROL INFORMATION

This application claims the benefit of PCT/KR2008/002690, filed on May 14, 2008, along with Korean Patent Application No. 10-2007-0048305, filed May 17, 2007 and Korean Patent Application No. 10-2007-0105738, filed Oct. 19, 2007, all of which are hereby incorporated herein by reference for all purposes in their entireties.

TECHNICAL FIELD

The present invention relates to a method for transmitting control information, and more particularly, to a method for transmitting control information to reduce overhead due to control signaling.

BACKGROUND ART

In next generation multimedia mobile communication systems, which have been actively studied in recent years, there is a demand for a system capable of processing and transmitting a variety of information (e.g., video and radio data) in addition to the early-stage voice service.

Orthogonal frequency division multiplexing (OFDM) is a multiple-subcarrier modulation scheme in which data transmission is achieved by dividing a frequency bandwidth into a plurality of orthogonal subcarriers. The OFDM is one of noticeable core technologies in the next generation multimedia mobile communication systems. Orthogonal frequency division multiple access (OFDMA) provides multi-user multiplexing by combining the OFDM with frequency division multiple access (FDMA) or time division multiple access (TDMA) or code division multiple access (CDMA).

A multiple-input multiple-output (MIMO) system uses multiple transmitting antennas and multiple receiving antennas to improve efficiency of data transmission and reception. A MIMO technology includes spatial diversity and spatial multiplexing. The spatial diversity is a technique in which the multiple transmitting antennas transmit the same data and thus transmission reliability increases. The spatial multiplexing is a technique in which the multiple transmitting antennas simultaneously transmit different data and thus a high speed data can be transmitted without increasing a system bandwidth. The MIMO system has a plurality of independent channels according to the number of transmitting antennas and the number of receiving antennas. Each independent channel can be referred to as a spatial layer or a stream.

In general, a control signal is periodically or event-drivenly transmitted from a base station (BS) to a subscriber station (SS), or from the SS to the BS. The control signal represents a signal that does not include a user signal. Hereinafter, a downlink (DL) represents a transmission from the BS to the SS, and an uplink (UL) represents a transmission from the SS to the BS. An example of UL control signals, there is a channel quality indicator (CQI). In general, the SS periodically transmits the CQI to the BS in order to report channel quality.

The CQI is information required when the BS optimally allocates resources to the SS. The shorter the transmission period of the CQI becomes, the better the channel quality of the service is. However, due to overhead resulted from CQI transmission, there is a limit in reducing the transmission period of the CQI. Further, in the MIMO system, the CQI for each stream may be transmitted, or additional MIMO control information may be transmitted. Therefore, overhead resulted from control information increases more largely.

Accordingly, there is a need for a method for reducing overhead resulted from the periodically transmitted control information such as CQI.

DISCLOSURE OF INVENTION

Technical Problem

A method is sought for transmitting control information in order to reduce overhead due to control signaling.

Technical Solution

In an aspect, a method for transmitting control information is provided. The method includes receiving a control information request, transmitting primary control information through a primary channel in response to the control information request and transmitting secondary control information through a secondary channel in response to the control information request, wherein the secondary control information is an average value of control information on a frequency band.

In another aspect, a method for transmitting control information includes negotiating basic capabilities including control channel information, receiving a channel quality measurement request including channel quality indicator (CQI) channel information, generating primary control information and secondary control information each having a different payload size according to the control channel information and the CQI channel information and transmitting the primary control information through a primary channel and transmitting the secondary control information through a secondary channel.

In still another aspect, a method for transmitting control information includes transmitting a piece of control information through a primary channel, and phase-shifting the control information and transmitting the control information through a secondary channel of which a transmission period is shorter than that of the primary channel.

In still another aspect, a method for transmitting control information includes transmitting one of a plurality of pieces of control information through a data subcarrier; and transmitting the remaining pieces of control information, other than the control signal carried on the data subcarrier, through a pilot subcarrier.

ADVANTAGEOUS EFFECTS

A channel quality indicator (CQI) can be transmitted through an acknowledgement (ACK) channel without influencing the transmission of ACK/not-acknowledgement (NACK) information, and CQIs of a plurality of streams can be transmitted on a primary/secondary fast-feedback channel in a multi-antenna system, thereby reducing an overhead resulted from feedback of the CQIs. In addition, the CQI can be transmitted through the primary/secondary channel by varying the type of the CQI or by including control information required for the multi-antenna system, thereby reducing the number of fast-feedback channels to be transmitted.

MODE FOR THE INVENTION

Figure 1:
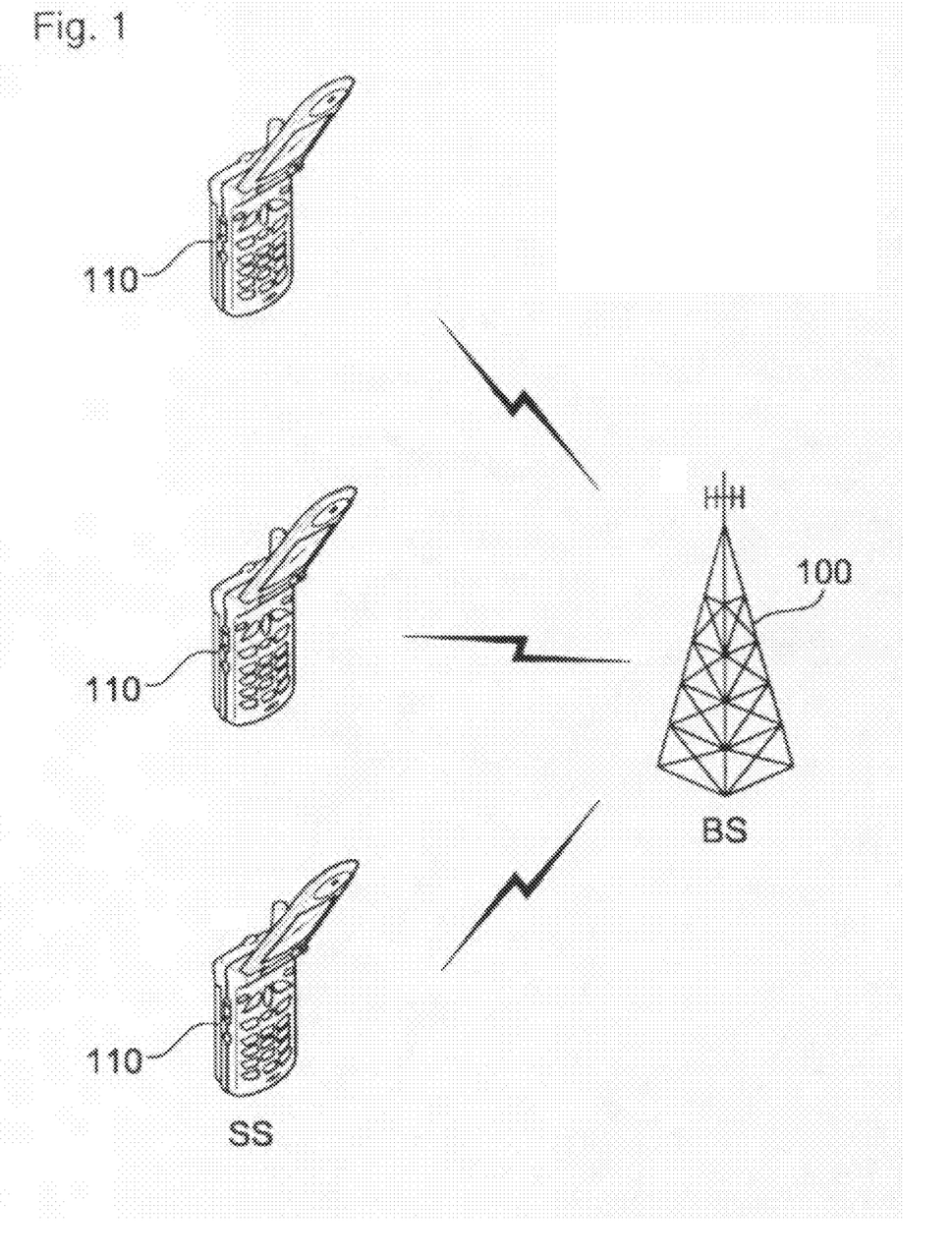
FIG. 1 shows an example of a wireless communication system.

FIG. 1 shows an example of a wireless communication system.

Referring to FIG. 1, the wireless communication system includes a base station (BS) 100 and at least one subscriber station (SS) 110. The wireless communication system can be widely deployed to provide a variety of communication services, such as voices, packet data, etc. The BS 100 is generally a fixed station that communicates with the SS 110 and may be referred to as another terminology, such as a node-B, a base transceiver system (BTS), an access point, etc. The SS 110 may be fixed or mobile, and may be referred to as another terminology, such as a user equipment (UE), a user terminal (UT), a mobile station (MS), a wireless device, etc.

The BS 100 receives uplink (UL) data through an UL channel. The UL channel is a channel through which the UL data is transmitted. The UL data includes a control signal or a user signal. The user signal is a signal for carrying user data. The control signal is a signal for carrying data other than the user data. The control signal may include feedback information (e.g., a channel quality indicator (CQI), an acknowledgement (ACK)/not-acknowledgement (NACK) signal, etc) and scheduling information (e.g., radio resource allocation information, power level control information, synchronization information, etc.). The control information is required for successful user signal transmission between the BS 100 and the SS 110. For example, the BS 100 receives the CQI from the SS 110 and determines a transmission format, a power level, a data rate, or the like by using the received CQI. The BS 100 processes the user signal by using the determined transmission format, power level, data rate, etc., and transmits the user signal to the SS 110 through a downlink (DL) channel. The BS 100 increases a data transmission rate by allocating optimal resources to the SS 110 by using the CQI.

The SS 110 receives DL data through the DL channel. Similarly to the UL data, the DL data includes a control signal or a user signal. The DL data may include a pilot for CQI measurement or a preamble for synchronization. The pilot is a signal which is known between the BS 100 and the SS 110 in order to perform channel estimation or data modulation. The pilot is also referred to as a reference signal. The SS 110 measures CQI by using the pilot. The SS 110 reports the measured CQI to the BS 100.

The wireless communication system may be an orthogonal frequency division multiplexing (OFDM)/orthogonal frequency division multiple access (OFDMA)-based system. The OFDM uses a plurality of orthogonal subcarriers. The OFDM uses an orthogonality between inverse fast Fourier transform (IFFT) and fast Fourier transform (FFT). A transmitter transmits data after performing IFFT. A receiver restores original data by performing FFT on a received signal. The transmitter uses IFFT to combine the plurality of subcarriers, and the receiver uses FFT corresponding to the IFFT to split the plurality of subcarriers. In DL, the transmitter may be a part of the BS 100, and the receiver may be a part of the SS 110. In UL, the transmitter may be a part of the SS 110, and the receiver may be a part of the BS 100.

Figure 2:
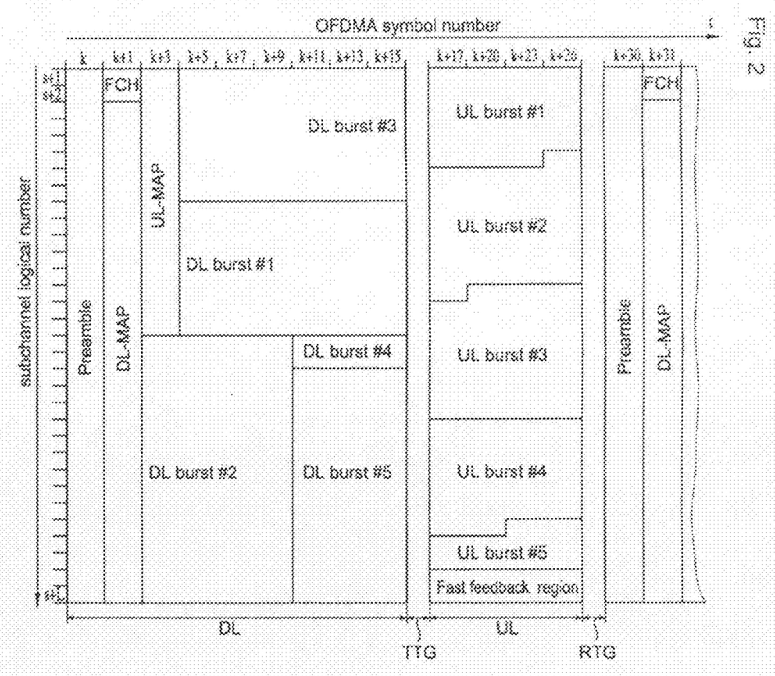
FIG. 2 shows an example of a frame structure.

FIG. 2 shows an example of a frame structure. A frame is a data sequence used according to a physical specification in a fixed time duration. The frame may be an OFDMA frame.

Referring to FIG. 2, the frame includes a DL frame and a UL frame. Time division duplex (TDD) is the scheme that UL and DL transmissions share the same frequency but are performed in different time periods. The DL frame is prior to the UL frame in time domain. The DL frame includes a preamble, a frame control header (FCH), a DL-MAP, a UL-MAP, and a DL burst region. The UL frame includes a UL burst region.

Guard times for separating the UL frame and the DL frame are inserted into an intermediate portion (between the DL frame and the UL frame) and the last portion (subsequently to the UL frame) of the frame. A transmit/receive transition gap (TTG) is a gap between a DL burst and a subsequent UL burst. A receive/transmit transition gap (RTG) is a gap between a UL burst and a subsequent DL burst.

A preamble is used for initial synchronization between a BS and a SS, cell search, frequency offset, and channel estimation. An FCH includes information regarding a length of a DL-MAP message and a coding scheme of the DL-MAP. The DL-MAP is a region where the DL-MAP message is transmitted. The DL-MAP message defines a connection of a DL channel. The DL-MAP message includes a configuration change count of a downlink channel descriptor (DCD) and a BS identifier (ID). The DCD describes a DL burst profile applied to a current MAP. The DL burst profile indicates characteristics of a DL physical channel. The DCD is periodically transmitted from the BS through a DCD message. The UL-MAP is a region where a UL-MAP message is transmitted. The UL-MAP message defines a connection of a UL channel. The UL-MAP message includes a configuration change count of an uplink channel descriptor (UCD) and also includes an effective start time of UL assignment defined by the UL-MAP. The UCD describes a UL burst profile. The UL burst profile indicates characteristics of a UL physical channel. The UCD is periodically transmitted from the BS through a UCD message.

A fast-feedback region is included in a portion of the UL frame. The fast-feedback region is assigned for UL data transmission faster than general UL data transmission. A CQI, an ACK/NACK signal, or multi-antenna control information, etc. may be carried on the fast-feedback region. The fast-feedback region can be used for CQI channel or ACK channel. The fast-feedback region may be located in any link frames, and the location and size of the fast-feedback region is not limited to those shown in FIG. 2.

A slot is a minimum unit of possible data allocation, and is defined by a time and a subchannel. The subchannel can be constructed of a plurality of tiles in UL. The subchannel can be constructed of 6 tiles. In UL, one burst can be constructed three OFDM symbols and one subchannel. In a partial usage of subchannel (PUSC) permutation, each tile may include 4 consecutive subcarriers on three OFDM symbols. The PUSC subcarriers can include 8 data subcarriers and 4 pilot subcarriers. In an optional PUSC permutation, each tile may include three consecutive subcarriers on three OFDM symbols. The optional PUSC subcarriers can include 8 data subcarriers and one pilot subcarrier. Tiles included in the subchannel are distributed and disposed over the whole bandwidth. A bin includes 9 contiguous subcarriers on an OFDM symbol. A band is a group of 4 rows of the bin. An adaptive modulation and coding (AMC) subchannel includes 6 contiguous bins.

Figure 3:
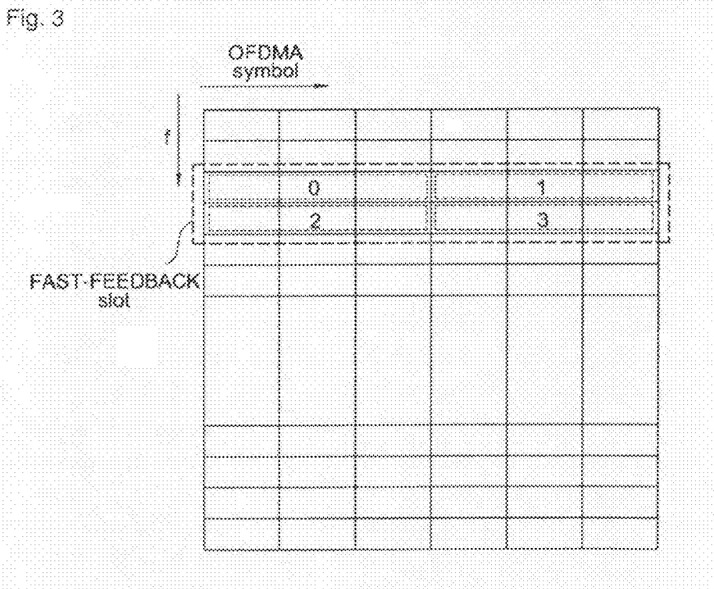
FIG. 3 shows an example of a fast-feedback region.

FIG. 3 shows an example of a fast-feedback region.

Referring to FIG. 3, a fast-feedback message is mapped to the fast-feedback region. One fast-feedback message can occupy one fast-feedback slot. Herein, 4 subchannels are assigned to one fast-feedback slot.

One subchannel may include a plurality of tiles. It is assumed herein that one subchannel includes 6 tiles. When PUSC tile is used, one subchannel includes 48 data subcarriers and 24 pilot subcarriers. When optional PUSC tile is used, one subchannel includes 48 data subcarriers and 6 pilot subcarriers.

Examples of control information are a CQI, an ACK/NACK signal, multi-antenna control information, etc. A method for transmitting the control information according to control information request of a BS will be described.

Figure 4:
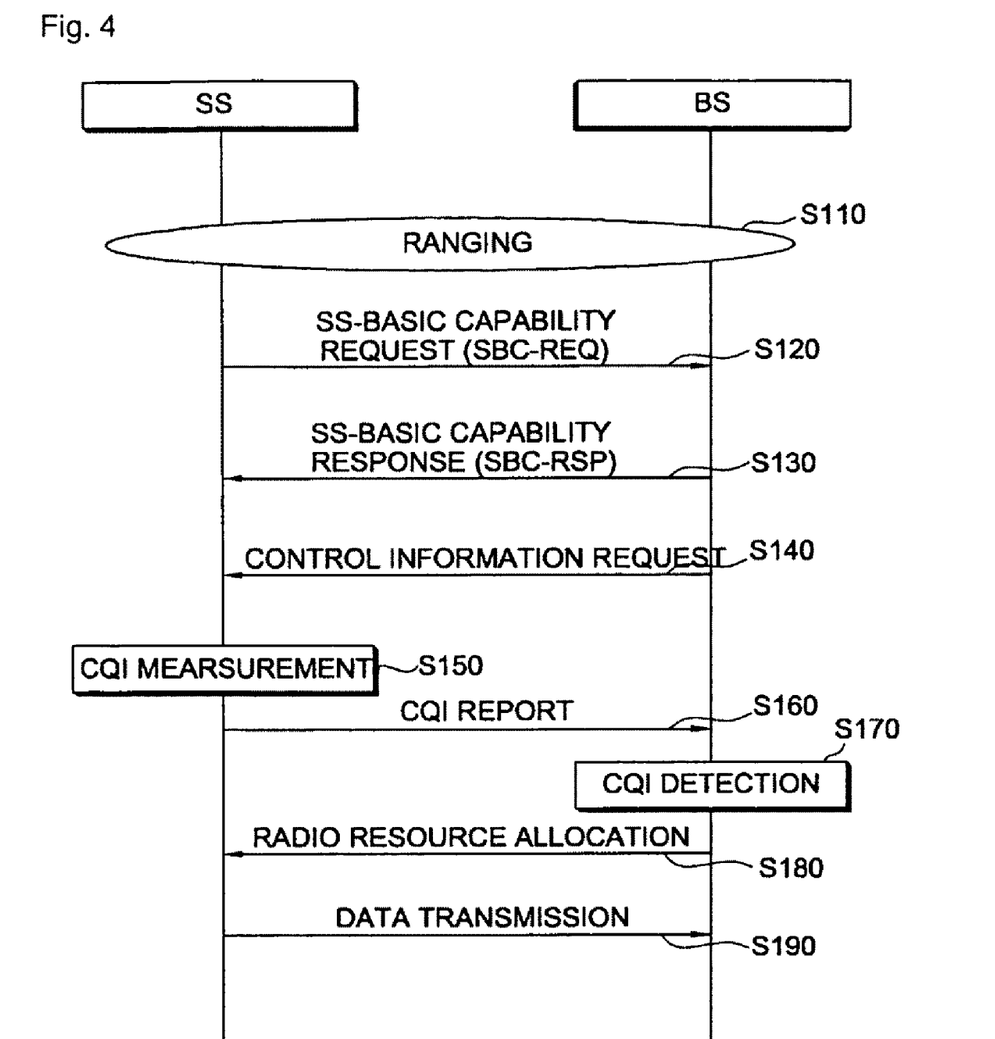
FIG. 4 is a flow diagram showing a method for transmitting control information according to an embodiment of the present invention.

FIG. 4 is a flow diagram showing a method for transmitting control information according to an embodiment of the present invention. It will be assumed hereinafter that, when a BS requests a CQI, the CQI and an ACK/NACK signal are multiplexed and transmitted. This is for explanation purposes only. Thus, the present invention may also apply in various ways, for example, by multiplexing a CQI and a precoding matrix indicator (PMI) or a PMI and the ACK/NACK signal.

Referring to FIG. 4, at S110, ranging is performed between the BS and a SS. The ranging may be initial ranging or periodic raging. The initial ranging is a process which acquires an exact timing offset between the BS and the SS and adjusts initial transmission power. The periodic ranging is a process which periodically tracks a UL timing offset and received signal strength after the initial ranging is performed.

The SS transmits an SS-basic capability request (SBC-REQ) to the BS at S120. The SBC-REQ includes information regarding capability that can be supported by the SS for effective communication between the SS and the BS. Further, the SBC-REQ includes bandwidth allocation information and physical parameter information. The physical parameter information may include information regarding a variety of communication parameters, such as, a transmission interval of the SS, maximum transmit power, current transmit power, UL control channel information, etc. The UL control channel information indicates a control channel type supported in UL transmission.

Table 1 shows an example of UL control channel information. The description of Table 1 is not supported when a bit #n is '0' and is applied when the bit #n is '1'.

TABLE 1

| Bit | Description |
| --- | --- |
| #0 | 3 bit-MIMO fast-feedback |
| #1 | Enhanced fast-feedback under negotiation for SBC fast-feedback, if enhanced feature is enabled, the SS should use only the enhanced fast-feedback channel in the CQICH allocation IE |
| #2 | UL ACK |
| #3 | Enhanced UL ACK/CQI channel |
| #4 | UEP fast-feedback |
| #5 | A measurement report shall be performed on the last DL burst |
| #6 | Primary/Secondary fast-feedback |
| #7 | DIUC-CQI fast-feedback |

When a bit #0 is '1', a fast-feedback of multiple-input multiple-output (MIMO) information of a 3-bit payload is supported. The fast-feedback is UL transmission faster than general UL data transmission. When a bit #1 is '1' a 6-bit payload fast-feedback, which is enhanced from a 3-bit payload fast-feedback, is supported in signaling of a CQI channel (CQICH). In this case, the SS uses a fast-feedback channel.

A UL ACK channel is supported when a bit #2 is '1'.

A UL ACK/CQI channel, through which ACK and CQI can be simultaneously transmitted, is supported when a bit #3 is '1'. The UL ACK/CQI channel is used to transmit the CQI through the ACK channel. The CQI and ACK/NACK information are simultaneously transmitted by using phase shift of a signal through the UL ACK/CQI channel.

An unequal error protection (UEP) fast-feedback is supported when a bit #4 is '1'. The UEP fast-feedback means that each payload bit is repeatedly transmitted according to a defined repetition rate.

A post-processing carrier-to-interference-and-noise ratio (CINR) measurement report for each spatial layer of a MIMO-supporting SS is formed on a DL burst when a bit #5 is '1'.

A primary/secondary fast-feedback is supported when a bit #6 is '1'. The primary fast-feedback and the secondary fast-feedback are classified according to a method for mapping a control signal to a tile.

A downlink interval usage-code (DIUC)-CQI fast-feedback is supported when a bit #7 is '1'.

Table 2 below shows another example of the UL control channel information. Table 2 is different in a bit #3 and a bit #7 from Table 1.

TABLE 2

| Bit | Description |
| --- | --- |
| #0 | 3 bit-MIMO fast-feedback |
| #1 | Enhanced fast-feedback under negotiation for SBC fast-feedback, if enhanced feature is enabled, the SS should use only the enhanced fast-feedback channel in the CQICH allocation IE |
| #2 | UL ACK |
| #3 | Reserved. Shall be set to zero |
| #4 | UEP fast-feedback |
| #5 | A measurement report shall be performed on the last DL burst |
| #6 | Primary/Secondary fast-feedback |
| #7 | Enhanced UL ACK/CQI channel |

The bit #3 is reserved, and may be set to '0'. A UL ACK/CQI channel capable of simultaneously transmitting UL ACK and CQI is supported when a bit #7 is '1'. The other bits #0 to #2 and #4 to #6 are the same as those described in Table 1 above.

The BS transmits an SS-basic capabilities response (SBC-RSP) to the SS at S130. The SBC-RSP is a response for the SBC-REQ and indicates capability to be applied to the communication between the SS and the BS. Capability negotiation between the SS and the BS is performed by using the SBC-REQ and the SBC-RSP. When a certain function is set to 'on' in the SBC-REQ, the function may be set to 'on' or 'off' in the SBC-RSP. A function which is set to 'on' in both the SBC-REQ and the SBC-RSP is applied to the communication between the SS and the BS.

The BS requests the SS to send control information at S140. The BS informs the SS of a method for transmitting the control information through a control information request message. The control information request message may be a channel quality measurement request message. The channel quality measurement request message may include information regarding UL radio resource allocation for CQI report such as a CQI transmission period, a frame offset, a CQICH type, etc.

Table 3 below shows a part of information regarding a method for transmitting control information when the BS transmits the control information to the SS. The control information indicated by a 'feedback type' is transmitted through a fast-feedback channel indicated by a 'CQICH type'.

TABLE 3

| Syntax | Size(bit) | Notes |
|---|---|---|
| For (number of pieces of control information){ | | |
| feedback type | 3 | 0b000-0b010: Fast DL measurement/default feedback depending on CQICH types0b011: Quantized precoding weight feedback0b100: Index to precoding matrix in codebook0b101: Channel matrix information0b110-0b111: Reserved |
| CQICH type | 3 | 0b000: 6-bit CQI0b001: Reserved0b010: 3-bit CQI(even)0b011: 3-bit CQI(odd)0b100: 6-bit CQI(primary)0b101: 4-bit CQI(secondary)0b110: 6-bit CQI(primary) + 4-bit CQI(secondary)0b111: Reserved |
| } | | |

If the 'CQICH type' is set to '0b110', 6-bit control information is transmitted through primary fast-feedback, and 4-bit control information is transmitted through secondary fast-feedback. It is possible to assign '6-bit CQI(primary)+4-bit CQI(secondary)' to a reserved '0b001' or '0b111'. For example, if the 'CQICH type' is '0b110', the SS simultaneously transmits 6-bit control information through a primary CQICH and 4-bit control signal through a secondary CQICH. In this case, the two types of control information to be transmitted are both defined by the 'feedback type'. Transmission may be achieved according to a specific rule, for example, in which the secondary CQICH always has to transmit an average CQI or an average codebook index, wherein the average CQI represents an average CQI of the entire bandwidth, or an average CQI of the entire bandwidth excluding a best-N band, or an average CQI of a bandwidth including only the best-N band and wherein the average codebook index is an average codebook of the entire bandwidth, or an average codebook of the entire bandwidth excluding the best-N band, or an average codebook including only the best-N band. For example, if the secondary CQICH transmits the average CQI of the bandwidth including only the best-N band, not only a differential value according to time difference but also a differential value to average CQI of the secondary CQICH can be transmitted in Band-AMC differential CQI transmission.

Alternatively, if only 'primary/secondary fast-feedback' is 'on' in the SBC-REQ/RSP, the SS can transmit the control information through the secondary fast-feedback channel without the request of the BS. However, a preliminary rule is required for a type of control information transmitted through the secondary fast-feedback channel. For example, a differential CQI of the best-N band can be transmitted in a band-AMC mode on the CQICH. In this case, an average CINR can be transmitted on the secondary fast-feedback channel. The average CINR may be an average CINR of the entire bandwidth, or an average CINR of the entire bandwidth excluding the best-N band, or an average CQI of a bandwidth including only the best-N band. Or differential CINRs can be transmitted on the secondary fast-feedback channel. The differential CINRs may be the differential values of previous CINRs of best-N band, the entire bandwidth including best-N band, or the entire bandwidth excluding the best-N band.

The SS measures channel quality to configure a CQI at S150. The CQI can be measured by using a pilot included in DL data transmitted from the BS. The CQI is information indicating a channel condition between the SS and the BS, and may be expressed in various forms such as a signal to interference plus noise ratio (SINR), a modulation and coding scheme (MCS) level, a data rate indicator, a received signal strength indicator, etc.

The configuration of the CQI varies depending on channels. When transmission is achieved through a UL ACK/CQI channel, the CQI may be configured with a differential CQI. The differential CQI may be a CQI obtained by reducing the number of levels of an original CQI or a CQI indicated by a differential value of a reference CQI. The differential CQI may be phase-shifted to indicate ACK or NACK information. That is, if the CQI is a primary control signal and the ACK/NACK information is a secondary control signal, the primary control signal and the secondary control signal are multiplexed. The primary control signal is phase-shifted based on the secondary control signal, and then the secondary control signal is multiplexed with the primary control signal. Thus, the phase-shifted primary control signal becomes a multiplexed control signal. The multiplexing of the control information will be described later.

If the wireless communication system is a MIMO system, the CQI is represented by a primary CQI and a secondary CQI with respect to a plurality of streams. The number of bits of the secondary CQI is less than that of the primary CQI. That is, a CQI of a first stream is composed of the primary CQI, and CQIs of the remaining streams are composed of the secondary CQI. The transmission of the CQI in the MIMO system will be described later.

The SS reports the CQI to the BS at S160. The CQI is transmitted through the CQICH and/or the UL ACK/CQI channel. The primary CQI and the secondary CQI can be transmitted through the CQICH. The differential CQI can be transmitted through the UL ACK/CQI channel. The SS periodically reports the CQI to the BS according to a CQI measurement period included in a channel quality measurement request message. The SS periodically measures the CQI according to the instruction of the BS, and reports the measured CQI to the BS. The UL ACK/CQI channel serves to transmit the CQI by using the ACK channel and has a period shorter than that of the CQICH.

The BS obtains the CQI through the received CQICH and/or UL ACK/CQI channel at S170. Coherent detection and non-coherent detection are generally used as a method for obtaining the CQI through the CQICH and/or the UL ACK/CQI channel. The coherent detection is a method in which the CQI is obtained after performing channel estimation by using a pilot. The non-coherent detection is a method in which the CQI is obtained without channel estimation.

The BS allocates radio resources to the SS at S180. After the radio resources are allocated, the SS transmits UL data by using the allocated radio resources at S190.

The CQI is phase-shifted on the UL ACK/CQI channel having a period shorter than that of the CQICH. Then, the CQI and ACK/NACK information are multiplexed. In the MIMO system, a CQI for each stream is represented by the primary CQI for one stream and the secondary CQI for remaining stream(s). Accordingly, a transmission period for transmitting the CQI on the CQICH can be extended, and the CQI can be transmitted with a smaller number of bits.

Hereinafter, multiplexing of the CQI and the ACK/NACK information and CQI transmission in the MIMO system will be described.

Figure 5:
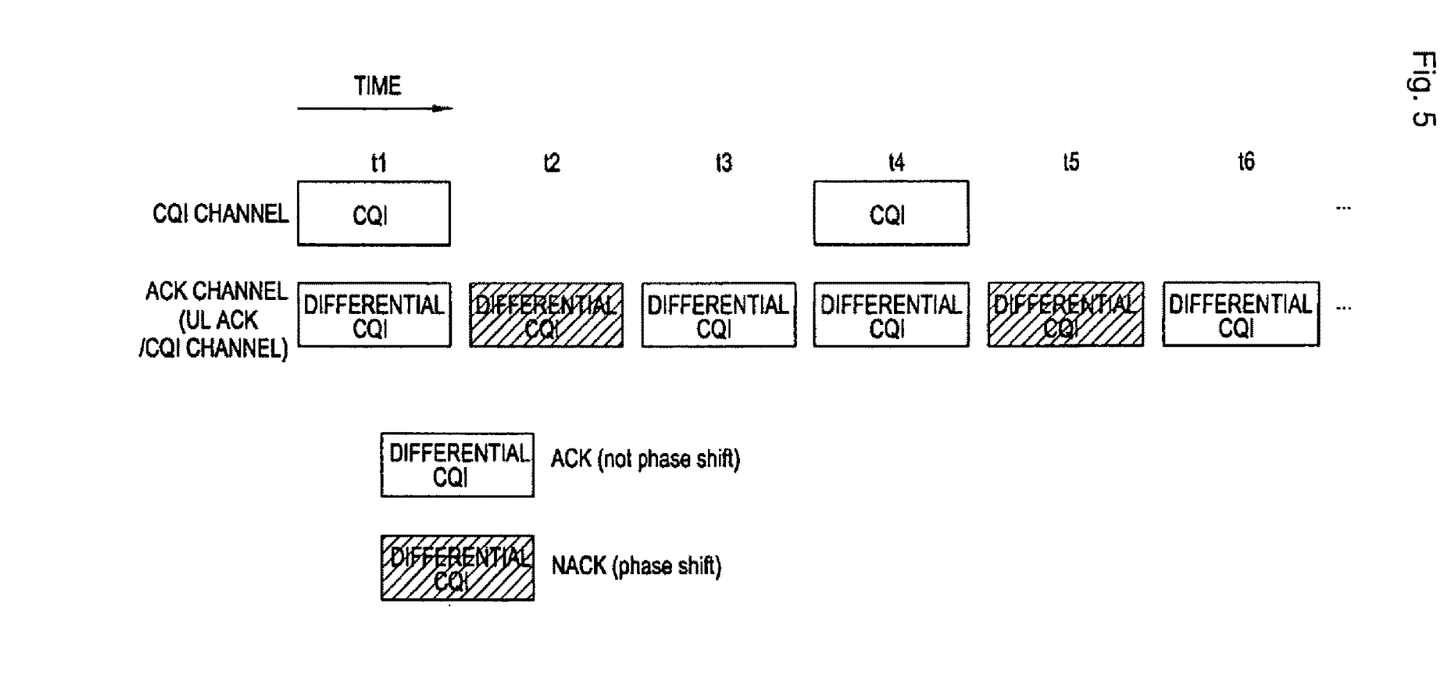
FIG. 5 shows channel quality indicator (CQI) transmission on a CQI channel (CQICH) and an acknowledgement (ACK) channel.

FIG. 5 shows CQI transmission on a CQICH and an ACK channel. The CQI transmission of FIG. 5 can be applied when the 'enhanced UL ACK/CQI channel' of the bit #3 of Table 1 or the bit #7 of Table 7 is set to '1'.

Referring to FIG. 5, a UL ACK/CQI channel is used to transmit a CQI through the ACK channel. On the UL ACK/

CQI channel, ACK/NACK information and the CQI can be simultaneously transmitted by using phase shift. One subchannel can be assigned to the CQICH. A 1/2 subchannel can be assigned to the ACK channel. In general, a transmission period of the CQICH is longer than that of the ACK channel. For example, a period of transmitting the CQI through the CQICH may be two periodic frames ($2^P$ frames) so that one CQI can be included in every two frames. An ACK/NACK signal may be transmitted through the ACK channel in every frame. It can be said that the ACK channel is a relatively fast transmission channel, and the CQICH is a relatively slow transmission channel.

It will be assumed that the CQI is transmitted on the ACK channel three times when the CQI is transmitted on the CQICH one time. In this case, a time for transmitting the CQI of the CQICH may be different from that of the ACK channel. The CQI of the CQICH is a CQI having the original number of bits. The CQI of the ACK channel is a differential CQI having a smaller number of bits than the original number of bits. For example, the CQI of the CQICH may be a 6-bit CQI, and the differential CQI on the ACK channel may be a 3-bit CQI. The 6-bit CQI can be transmitted by using a 6-bit payload that uses one subchannel of the CQICH. The 3-bit differential CQI can be transmitted by using a 3-bit payload that uses a 1/2 subchannel of the ACK channel.

In a method for creating a differential CQI having a smaller number of bits, the differential CQI can be created by decreasing a level of an original CQI. For example, 32 levels used to represent the CQI can be decreased to 8 levels. The 8 levels can be expressed in 3 bits. In another method for creating a differential CQI, the differential CQI can be created by using a differential value with respect to a reference CQI. That is, the differential CQI is transmitted on the ACK channel during a CQI transmission period and can be represented by a differential value with respect to a previous CQI on the CQICH or a previous CQI on the CQICH and ACK channel. For example, if a CQI is 20 dB at t1, 21 dB at t2, 18 dB at t3, 17 dB at t4, 18 dB at t5, and 19 dB at t6, then CQI transmission can be achieved as shown in Table 4 below.

TABLE 4

| | Time | | | | | |
|---|---|---|---|---|---|---|
| | t1 | t2 | t3 | t4 | t5 | t6 |
| CQI | 20 | 21 | 18 | 17 | 18 | 19 |
| CQICH | 20 | | | 17 | | |
| ACK channel (case1) | 0 | +1 | −2 | 0 | +1 | +2 |
| ACK channel (case2) | 0 | +1 | −3 | 0 | +1 | +1 |

On the CQICH, a CQI of 20 dB and a CQI of 17 dB are transmitted at t1 and t4, respectively. On the ACK channel, 6 CQIs are transmitted at t1 to t6. In case 1, on the ACK channel, CQIs at t1, t2, and t3 are represented by differential values with respect to the CQI at t1 as a reference, and CQIs at t4, t5, and t6 are represented by differential values with respect to the CQI at t4 as a reference. In case 2, on the ACK channel, CQIs at t1, t2, and t3 are represented by differential values with respect to CQIs at t1, t1, and t2, respectively, and CQIs at t4, t5, and t6 are represented by differential values with respect to CQIs at t4, t4, and t5, respectively.

The differential CQI of the ACK channel is phase-shifted to represent ACK or NACK. For example, the differential CQI may represent ACK if it is transmitted without phase shift and may represent NACK if it is transmitted with phase shift. In FIG. 5, the CQIs in the ACK channel at t2 and t5 represent NACK, and the remaining CQIs represent ACK.

Hereinafter, a method in which a 3-bit differential CQI is mapped to three tiles of a 1/2 subchannel of the ACK channel and a method of phase shifting will be described.

Table 5 shows modulation symbols carried on 8 data subcarriers included in one tile used at the ACK channel. One modulation symbol is modulated into one subcarrier. 8 modulation symbols carried on one tile constitute one vector. A total of 8 types of vectors are created. Vector indices are in the range of 0 to 7.

TABLE 5

| Vector index | $M_{n,\,m8}, M_{n,\,8m+1}, \ldots M_{n,\,8m+7}$ |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

Modulation symbols constituting each vector can be expressed by Equation 1 below.

MathFigure 1

$$P0 = \exp\left(j \cdot \frac{\pi}{4}\right)$$
$$P1 = \exp\left(j \cdot \frac{3\pi}{4}\right)$$
$$P2 = \exp\left(-j \cdot \frac{3\pi}{4}\right)$$
$$P3 = \exp\left(-j \cdot \frac{\pi}{4}\right)$$

[Math. 1]

In this case, vectors having different indices are orthogonal to each other.

If the differential CQI is represented by a 3-bit payload, the vector assigned to the ACK channel can be expressed as shown in Table 6 below.

TABLE 6

| 3-bit payload(binary) | Fast Feedback vector indices per TileEven = {Tile(0), Tile(2), Tile(4)} orOdd = {Tile(1), Tile(3), Tile(5)} |
|---|---|
| 000 | 0, 0, 0 |
| 001 | 1, 1, 1 |
| 010 | 2, 2, 2 |
| 011 | 3, 3, 3 |
| 100 | 4, 4, 4 |
| 101 | 5, 5, 5 |
| 110 | 6, 6, 6 |
| 111 | 7, 7, 7 |

A 1/2 subchannel is assigned to the ACK channel. Thus, one ACK channel includes three tiles. Since one vector is assigned to one tile, three vectors are required to express a differential CQI. The combination of the vector of Table 5 depending on indices and the vector of Table 6 depending on CQI values is shown for exemplary purposes only. Thus, the vector combination is not limited thereto, and those skilled in the art can easily modify the number of vector indices or a payload size.

The differential CQI may be multiplexed to indicate ACK when transmitted without phase shift and to indicate NACK when transmitted with phase shift. Alternatively, the differential CQI may be multiplexed to indicate NACK when transmitted without phase shift and to indicate ACK when transmitted with phase shift. That is, if the differential CQI is a primary control signal and the ACK/NACK signal is a secondary control signal, the primary control signal and the secondary control signal are multiplexed. The differential CQI which represents an original CQI value can be transmitted together with ACK/NACK signal through ACK channel by shifting the phase of the differential CQI.

The differential CQI is phase-shifted by multiplying each modulation symbol by a phase-shift value. This can be expressed by Equation 2 below.
MathFIG. 2

$$P0_{ps}=P0e^{j\theta}, P1_{ps}=P1e^{j\theta}$$

$$P2_{ps}=P2e^{j\theta}, P3_{ps}=P3e^{j\theta} \quad [\text{Math.2}]$$

Herein, θ denotes a phase-shift value. For example, the differential CQI can be phase-shifted by a phase shift value θ=π/4 by multiplying each modulation symbol by exp(jπ/4).

Although it is assumed that one tile described here is for PUSC permutation and the CQI is carried on 8 data subcarriers of each tile, this is for exemplary purposes only. Thus, a tile may be for PUSC permutation and the CQI may be carried on 4 pilot subcarriers of each tile. Further, a tile may be for PUSC permutation and the CQI may be carried on both the 8 data subcarriers and the pilot subcarriers of each tile. Furthermore, a tile may be for optional PUSC permutation and the CQI may be carried on the 8 data subcarriers and/or one pilot subcarrier of each tile.

Meanwhile, The differential CQI can be indicated by shifting a phase of the ACK/NACK signal while transmitting the ACK/NACK signal through the ACK channel. For example, 4 differential CQIs can be indicated by applying 4 phases (e.g., π/4, π/2, 3π/4, and π) to the ACK/NACK signal.

By transmitting the differential CQI through the ACK channel, a period for transmitting the CQI on the CQICH can be further extended and the CQICH can be utilized for the transmission of another control signal. In addition, since ACK or NACK can be represented by phase-shifting the differential CQI, the transmission of the ACK/NACK signal is not affected.

Figure 6:
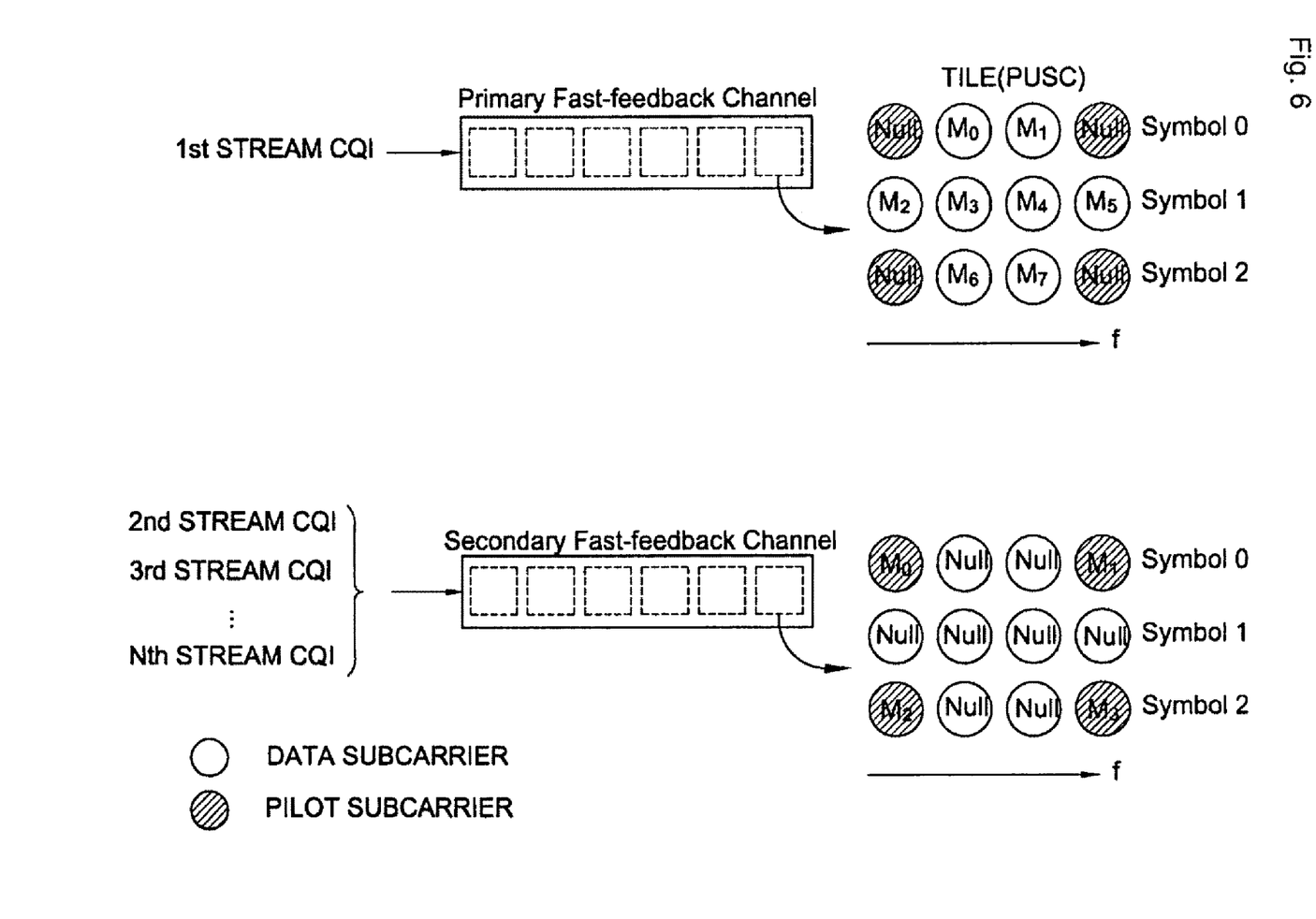
FIG. 6 shows CQI transmission in a multi-antenna system.

FIG. 6 shows CQI transmission in a multi-antenna system. The CQI transmission of FIG. 6 can apply when a CQICH type is '0b110' in Table 3 above. Further, the CQI transmission of FIG. 6 can apply when a bit #6 is set to '1' and the remaining bits are set to '0' in Table 1 or Table 2 above. The multi-antenna system may be a multiple-input multiple-output (MIMO) system, a multiple-input single-output (MISO) system, a single-input single-output (SISO) system, or a single-input multiple-output (SIMO) system. The present invention may be applied to a multi-antenna system using two or more streams.

Referring to FIG. 6, the multi-antenna system has a plurality of streams. Interference among streams is minimized, and one stream constitutes one independent channel. That is, N CQIs can be transmitted for N streams. One of the N CQIs is a primary CQI, and the remaining N−1 CQIs are secondary CQI. The primary CQI and the secondary CQI are transmitted on a CQICH. The CQICH may be classified into a primary fast-feedback channel and a secondary fast-feedback channel. The primary CQI is transmitted on the primary fast-feedback channel, and the secondary CQI is transmitted on the secondary fast-feedback channel.

The primary CQI and the secondary CQI have a structure as described below. The number of bits of the primary CQI is sufficient to represent all general CQI levels. The number of bits of the secondary CQI is less than that of the primary. CQI.

The primary CQI can be assigned to a CQI for a first stream, and the secondary CQI can be assigned to CQIs for the remaining streams. For example, if CQIs of three streams are respectively 18 dB, 9 dB, and 7 dB, the primary CQI and the secondary CQI can be configured as shown in Table 7 below.

TABLE 7

|  | CQI | primary CQI | secondary CQI (case 1) | secondary CQI (case 2) |
|---|---|---|---|---|
| first stream | 18 | 18 | | |
| second stream | 9 | | 10 | 8 |
| third stream | 7 | | | |

The primary CQI is 18 dB which is the same as the CQI of the first stream. In case 1, the secondary CQI is an average of differential values with respect to the primary CQI. That is, the secondary CQI is {(18−9)+(18−7)}/2=10 dB. In case 2, the secondary CQI is an average of CQIs of all remaining streams. That is, the secondary CQI is (9+7)/2=8 dB. Alternatively, a CQI of a second stream and a CQI of a third stream are coded into 1 to 2-bit CQIs and are then combined to obtain a 4-bit CQI. The primary CQI can be expressed in 6 bits, and the secondary CQI can be expressed in 4 bits.

The primary CQI is transmitted through the primary fast-feedback channel. The primary fast-feedback channel may be one of 4 subchannels constituting a fast-feedback slot. The primary CQI can be mapped to a data subcarrier of each tile included in the subchannel. In case of PUSC, the primary CQI can be mapped to 8 data subcarriers of each tile. 'Null' or a pilot signal can be mapped to 4 pilot subcarriers. Modulation symbols carried on 8 data subcarriers included in one tile can be expressed as shown in Table 5 above. The modulation symbols constituting each vector can be expressed by Equation 1 above.

When a 6-bit payload can carry the primary CQI, vectors assigned to the primary fast-feedback channel can be expressed by Table 8 below.

TABLE 8

| 6-bit Payload (binary) | Fast-feedback vector indices per Tile Tile(0), Tile(1), . . . Tile(5) |
|---|---|
| 000000 | 0, 0, 0, 0, 0, 0 |
| 000001 | 1, 1, 1, 1, 1, 1 |
| 000010 | 2, 2, 2, 2, 2, 2 |
| 000011 | 3, 3, 3, 3, 3, 3 |
| 000100 | 4, 4, 4, 4, 4, 4 |
| 000101 | 5, 5, 5, 5, 5, 5 |
| 000110 | 6, 6, 6, 6, 6, 6 |
| 000111 | 7, 7, 7, 7, 7, 7 |
| 001000 | 2, 4, 3, 6, 7, 5 |
| 001001 | 3, 5, 2, 7, 6, 4 |
| 001010 | 0, 6, 1, 4, 5, 7 |
| 001011 | 1, 7, 0, 5, 4, 6 |
| 001100 | 6, 0, 7, 2, 3, 1 |
| 001101 | 7, 1, 6, 3, 2, 0 |
| 001110 | 4, 2, 5, 0, 1, 3 |
| 001111 | 5, 3, 4, 1, 0, 2 |
| 010000 | 4, 3, 6, 7, 5, 1 |
| 010001 | 5, 2, 7, 6, 4, 0 |
| 010010 | 6, 1, 4, 5, 7, 3 |
| 010011 | 7, 0, 5, 4, 6, 2 |
| 010100 | 0, 7, 2, 3, 1, 5 |
| 010101 | 1, 6, 3, 2, 0, 4 |
| 010110 | 2, 5, 0, 1, 3, 7 |
| 010111 | 3, 4, 1, 0, 2, 6 |
| 011000 | 3, 6, 7, 5, 1, 2 |
| 011001 | 2, 7, 6, 4, 0, 3 |
| 011010 | 1, 4, 5, 7, 3, 0 |
| 011011 | 0, 5, 4, 6, 2, 1 |

TABLE 8-continued

| 6-bit Payload (binary) | Fast-feedback vector indices per Tile Tile(0), Tile(1), ... Tile(5) |
|---|---|
| 011100 | 7, 2, 3, 1, 5, 6 |
| 011101 | 6, 3, 2, 0, 4, 7 |
| 011110 | 5, 0, 1, 3, 7, 4 |
| 011111 | 4, 1, 0, 2, 6, 5 |
| 100000 | 6, 7, 5, 1, 2, 4 |
| 100001 | 7, 6, 4, 0, 3, 5 |
| 100010 | 4, 5, 7, 3, 0, 6 |
| 100011 | 5, 4, 6, 2, 1, 7 |
| 100100 | 2, 3, 1, 5, 6, 0 |
| 100101 | 3, 2, 0, 4, 7, 1 |
| 100110 | 0, 1, 3, 7, 4, 2 |
| 100111 | 1, 0, 2, 6, 5, 3 |
| 101000 | 7, 5, 1, 2, 4, 3 |
| 101001 | 6, 4, 0, 3, 5, 2 |
| 101010 | 5, 7, 3, 0, 6, 1 |
| 101011 | 4, 6, 2, 1, 7, 0 |
| 101100 | 3, 1, 5, 6, 0, 7 |
| 101101 | 2, 0, 4, 7, 1, 6 |
| 101110 | 1, 3, 7, 4, 2, 5 |
| 101111 | 0, 2, 6, 5, 3, 4 |
| 110000 | 5, 1, 2, 4, 3, 6 |
| 110001 | 4, 0, 3, 5, 2, 7 |
| 110010 | 7, 3, 0, 6, 1, 4 |
| 110011 | 6, 2, 1, 7, 0, 5 |
| 110100 | 1, 5, 6, 0, 7, 2 |
| 110101 | 0, 4, 7, 1, 6, 3 |
| 110110 | 3, 7, 4, 2, 5, 0 |
| 110111 | 2, 6, 5, 3, 4, 1 |
| 111000 | 1, 2, 4, 3, 6, 7 |
| 111001 | 0, 3, 5, 2, 7, 6 |
| 111010 | 3, 0, 6, 1, 4, 5 |
| 111011 | 2, 1, 7, 0, 5, 4 |
| 111100 | 5, 6, 0, 7, 2, 3 |
| 111101 | 4, 7, 1, 6, 3, 2 |
| 111110 | 7, 4, 2, 5, 0, 1 |
| 111111 | 6, 5, 3, 4, 1, 0 |

One subchannel is assigned to the primary fast-feedback channel. Thus, one primary fast-feedback channel includes 6 tiles. Since one vector is assigned to one tile, 6 vectors are required to represent the primary CQI.

The secondary CQI is transmitted through the secondary fast-feedback channel. The secondary fast-feedback channel may be one of the 4 subchannels constituting the fast-feedback slot. The secondary fast-feedback channel may be a subchannel different from the primary fast-feedback channel. The secondary CQI can be mapped to a pilot subcarrier of each tile. In case of PUSC, the secondary CQI is mapped to 4 data subcarriers of each tile. Null or a pilot signal can be mapped to 8 data subcarriers. Modulation symbols carried on 4 pilot subcarriers included in one tile can be expressed as shown in Table 9 below.

TABLE 9

| Vector index | $M_{n,\,4m}$, $M_{n,\,4m+1}$, $M_{n,\,4m+2}$, $M_{n,\,4m+3}$ |
|---|---|
| 0 | P0, P0, P0, P0 |
| 1 | P0, P2, P0, P2 |
| 2 | P0, P1, P2, P3 |
| 3 | P1, P0, P3, P2 |

The modulation symbols constituting each vector can be expressed by Equation 1 above.

When a 4-bit payload can carry the secondary CQI, vectors assigned to the CQICH can be expressed by Table 10 below.

TABLE 10

| Four-bit payload(binary) | Vector indices per tile Tile(0), Tile(1), Tile(2), Tile(3), Tile(4), Tile(5) |
|---|---|
| 0000 | 0, 0, 0, 1, 1, 1 |
| 0001 | 1, 1, 1, 0, 0, 0 |
| 0010 | 2, 2, 2, 3, 3, 3 |
| 0011 | 3, 3, 3, 2, 2, 2 |
| 0100 | 0, 1, 2, 3, 0, 1 |
| 0101 | 1, 2, 3, 0, 1, 3 |
| 0110 | 2, 3, 0, 1, 2, 3 |
| 0111 | 3, 0, 1, 2, 3, 0 |
| 1000 | 0, 0, 1, 3, 2, 2 |
| 1001 | 1, 3, 2, 2, 3, 1 |
| 1100 | 2, 2, 3, 1, 0, 0 |
| 1110 | 3, 3, 1, 0, 1, 1 |
| 1100 | 0, 0, 3, 2, 0, 3 |
| 1101 | 1, 2, 0, 2, 2, 0 |
| 1110 | 2, 1, 3, 3, 1, 2 |
| 1111 | 3, 2, 2, 1, 1, 2 |

One subchannel is assigned to the secondary fast-feedback channel. Thus, one secondary fast-feedback channel includes 6 tiles. Since one vector is assigned to one tile, 6 vector are required to represent the secondary CQI.

The combinations of the vector of Tables 5 and 9 depending on indices and the vector of Tables 8 and 10 depending on CQI values are shown for exemplary purposes only. Thus, the vectors can be combined without restriction, and those skilled in the art can easily modify the number of vector indices or a payload size.

Every function as described above can be performed by a processor such as a micro-processor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method for transmitting control information, the method comprising:
   receiving a control information request;
   transmitting primary control information, with a first period, responsive to the control information request through a primary control channel; and
   transmitting secondary control information, with a second period, responsive to the control information request through a secondary control channel,
   wherein the primary control information is a channel quality indicator (CQI) and the secondary control information is multiplexed information of a differential CQI and an ACK/NACK (acknowledgement/not-acknowledgement),
   and the first period is larger than the second period,
   and the differential CQI is a differential value with respect to the CQI,
   and the ACK/NACK is represented by whether the differential CQI is phase shifted or not.

2. The method of claim 1, wherein a payload size of the secondary control information is less than that of the primary control information.

3. The method of claim 2, wherein first radio resources allocated to the primary control channel are larger than second radio resources allocated to the secondary control channel.

4. The method of claim 1, wherein when the differential CQI is phase shifted, the differential CQI represents an ACK.

5. The method of claim 1, wherein when the differential CQI is not phase shifted, the differential CQI represents a NACK.

6. The method of claim 1, wherein the first period is a multiple of the second period.

* * * * *